United States Patent Office 3,849,371
Patented Nov. 19, 1974

3,849,371
THERMALLY STABLE FLAME RETARDANT
POLYPROPYLENE COMPOSITIONS
Lionel T. Wolford, Freehold, and John Versnel, Plainsboro, N.J., assignors to Cities Service Company, New York, N.Y.
No Drawing. Continuation-in-part of abandoned application Ser. No. 222,341, Jan. 31, 1972. This application Sept. 7, 1973, Ser. No. 395,202
Int. Cl. C08f 45/58
U.S. Cl. 260—45.75 B   3 Claims

ABSTRACT OF THE DISCLOSURE

When hexabromocyclododecane is used as a fire retarding agent in a flame retardant polymer composition, improved results are obtained when the hexabromocyclododecane, as produced in a typical bromination of cyclododecatriene, is treated by (a) contacting with a leaching agent, such as ethanol, (b) separating the insoluble residue and (c) recrystallizing the residue, thus recovering hexabromocyclododecane isomers melting above about 200° C., and thus improving the thermal stability of the composition.

CROSS-REFERENCE TO RELATED APPLICATION

This application is a continuation-in-part of the copending and related application Ser. No. 222,341, filed Jan. 31, 1972, now abandoned.

BACKGROUND OF THE INVENTION

This invention relates to flame retardant compositions comprising hexabromocyclododecane and flammable synthetic polymers. More specifically, it relates to flame retardant compositions comprising a high melting and thermally stable component of hexabromocyclododecane.

The preparation of hexabromocyclododecane by the bromination of 1,5,9-cyclododecatriene is well known, as disclosed in U.S. Pat. 3,558,727. According to this patent, the bromination procedure involves the addition of the reagents at spatially separated locations, with vigorous stirring. The product obtained has a melting point of about 175° C. Since this melting point appears sharply defined and since the patent discloses that the product is crystalline pure white in color, and does not need to be washed or recrystallized, the product is assumed to be of high purity. The use of this organic bromine compound as a fire retarding agent is disclosed in U.S. Pat. 3,419,-518. U.S. Pat. 3,093,599 discloses that brominated butadiene polymers split off HBr at a temperature range of 170–190° C. ,and processing a flame retardant composition of hexabromocyclododecane and a synthetic polymer, such as polypropylene, at a typical temperature of about 200° C. yields products which are discolored (yellow or brown). It is believed that this discoloration is due to of the hexabromocyclododecane product used. The number, types, and structures of these components are not known, but they are possibly various stereoisomers resulting from the bromination of isomeric cyclododecatrienes, such as cis-trans-trans- and trans-trans-trans-isomers, as well as other products obtained from the bromination of cyclododecatriene and having fewer than 6 bromine atoms. By using the typical products obtained by the bromination of cyclododecatriene as constituents in flame retardant compositions and by observing color changes in the composition when the composition is subjected to typical polymer processing conditions; it is evident that the typical prior art hexabromocyclododecane product contains undesirable components.

SUMMARY OF THE INVENTION

In a self-extinguishing flame retardant thermoplastic polymer composition comprising (a) polymers of ethylenically unsaturated monomers composed of at least 70 mole percent propylene, (b) a synergist and (c) hexabromocyclododecane, the probability of having components of hexabromocyclododecane that show substantial decomposition at typical polymer processing temperatures is reduced by treating the crude hexabromocyclododecane which is formed by the typical bromination of cyclododecatriene so as to separate the more thermally stable components from the less thermally stable components, thus obtaining a fraction or component of hexabromocyclododecane consisting essentially of hexabromocyclododecane isomers melting above about 200° C., as measured by differential scanning calorimetry. This fraction or component also is thermally stable under processing conditions from about 200° C. to about 235° C. The use of such a thermally stable component or fraction in the flame retardant composition yields a flame retardant composition that shows less thermal instability or decomposition at typical polymer processing temperatures.

Broadly, the invention concerns an improvement in prior art flame retardant compositions comprising polymers of ethylenically unsaturated monomers composed of at least 70 mole percent propylene, a synergist and hexabromocyclododecane, with the improvement being the use of hexabromocyclododecane isomers melting above about 200° C., as determined by differential scanning calorimetry.

DETAILED DESCRIPTION OF THE INVENTION

The flame retardant composition comprising the above-mentioned materials can be formed in any of the various ways known to the art, such as by use of a Banbury mixer. Since the polymeric substrate is that of an ethylenically unsaturated monomer composed of at least 70 mole percent propylene, polypropylene is a typical and well-known polymer used in this type composition. Copolymers, such as ethylene-propylene copolymer containing at least 70 mole percent propylene, can also be used. The fire retarding agent used in such a composition, such as the hexabromocyclododecane discussed below, is typically present in a concentration of from about 1.0 to about 6 weight percent (based on the total weight of the composition), with a preferable range of from about 1.3 to about 4.0 weight percent, sufficient to give a self-extinguishing mixture. Any of several well-known synergists that are used to enhance the action of the fire retarding agent can be used. Compounds of phosphorus, arsenic, antimony and bismuth are known synergists. $Sb_2O_3$ is a well-known and widely-used synergist and is preferred in the present composition. The amount of synergist used in a flame retardant composition is typically calculated on the basis of the ratio of the fire retarding agent to the synergist. In this invention, the ratio of the fire retarding agent to $Sb_2O_3$ can vary from about 0.5 to about 5.0, with a range of from about 0.8 to about 2.0 being preferred. Stabilizers, such as organotin compounds, are known in the art and can be used in the present composition. The amount of stabilizer is typically in the range of from about 0.25 to about 1.0%, based in the weight of the total composition. Other additives, such as pigments, can also be a part of the flame retardant composition. The order of mixing or addition of the above materials is not critical. A typical procedure is to add the polypropylene-containing polymer to a mixing device, followed by the desired weight of synergist, stabilizers, etc. The desired amount of fire retarding agent is typically added last to minimize any thermal decomposition.

The thermally stable component of hexabromocyclododecane can be prepared in a variety of ways. As discussed above, the typical bromination of a commercial cyclododecatriene forms a brominated hydrocarbon that appears to have a number of stereoisomers and brominated products having fewer bromines than are found in hexabromocyclododecane. We have discovered that this mixture of products, designated as "crude hexabromocyclododecane" responds to a rather simple chemical treatment so as to furnish what we designate "a thermally stable component." We believe that our treatment removes a less thermally stable component from the crude mixture. An outstanding characteristic of the desirable component is its thermal stability at its DSC melting point, which is in the temperature range of from about 200° C. to about 210° C. The term "thermal stability" means resistance to change or decomposition caused by heat. And this invention is concerned with the thermal stability, near the melting point, of the hexabromocyclododecane itself and also of the propylene polymer composition, of which the brominated organic compound is a part. Polypropylene is considered thermally stable at typical polymer processing temperatures of 200–255° C. But it is also known that some organic compounds are thermally unstable at or near their melting points, and these are frequently noted in chemical handbooks as melting with decomposition or having a decomposition temperature near the melting point. The hexabromocyclododecane of this invention has a melting point above 200° C., and when it melts, the liquid compound is thermally stable at typical polymer processing temperatures, as noted by the color evaluation of the processed sample. It will be appreciated by those skilled in the art that the crude hexabromocyclododecane obtained from the bromination of a commercial cyclododecatriene having a high cis-trans-trans content will have components or stereoisomers differing either in type or amount from a product prepared from a commercial cyclododecatriene having a high trans-trans-trans content. For this reason, it will be appreciated that the crude hexabromocyclododecanes obtained from various commercial cyclododecatrienes can be subjected to slight variations in the simple chemical treatment hereinafter disclosed so as to obtain the desirable thermally stable component.

The chemical treatment of a crude hexabromocyclododecane broadly comprises contacting with a desirable organic solvent, separation of the liquid phase from a residual solid phase and recrystallization of the solid phase by a suitable organic compound.

One simple and typical way of contacting the crude brominated hydrocarbon with a suitable organic solvent is to triturate, in a suitable container, a given weight of the crude product with about 4 times its weight of an organic solvent, such as ethanol. Or a Soxhlet extractor can be used. The crude hexabromocyclododecane is typically recovered in the form of small crystals that are readily amenable to this type of treatment.

The organic solvent used for contacting, or leaching, the crude product is desirably a liquid organic compound that offers a minimum of chemical interaction with the brominated hydrocarbon under the conditions of use. Desirable contacting or leaching liquids are lower alkanols having from 1 to about 5 carbon atoms, esters having from 2 to about 7 carbon atoms, ketones having from 3 to about 8 carbon atoms, and lower carboxylic acids having from 1 to about 5 carbon atoms. Representative of such solvents are isopropyl alcohol, amyl acetate, diethyl ketone, and propionic acid, respectively. A convenient and preferred contacting liquid is ethanol.

Broadly, the temperature of the contacting mixture is from about room temperature to about 170° C., with a typical procedure involving the use of the contacting liquid at its boiling point. Depending on the contact temperature, the time of contact can vary from a few minutes to about 1 hour, with a contact time of about 15 minutes at the boiling temperature of the liquid being sufficient to leach the undesirable components from the brominated hydrocarbon. Natually, it is desirable that the leached components be soluble in the leaching agent.

After contacting the crude product with a desirable leaching agent, the liquid phase can be separated from the residual solid by any convenient means, such as filtration. The solid phase is then recrystallized from a suitable solvent, using known and accepted criteria for this operation. Desirable recrystallizing solvents are aromatics and halogenated aromatics, such as benzene, toluene and chlorobenzene. Since it is commercially available, benzene is a preferred recrystallizing liquid. The recrystallization is done according to well-known techniques.

In another embodiment of the use of a thermally stable component of hexabromocyclododecane in a flame retardant composition, such a thermally stable component is obtained in good yield by the direct bromination of cyclododecatriene by the use of a mixed solvent system, such as described in co-pending application "Bromination of Unsaturated Hydrocarbons in Mixed Solvents," Ser. No. 275,981, filed July 28, 1972. By using a specific mixture of ethanol and benzene, a thermally stable hexabromocyclododecane component having a melting point of 200°–202° C. is obtained.

EXAMPLE I

Preparation of Hexabromocyclododecane
by Various Procedures (A) Using the procedure of U.S. Pat. 3,558,727, hexabromocyclododecane was prepared. The product had a melting point (capillary) 160–178° C. and a decomposition point (capillary) 178° C. (decomposition point=temperature where the sample shows decomposition by evolution of gas and significant discoloration).

(B) Using the procedure of German Pat. 1,147,575, hexabromocyclododecane was prepared. The product had a melting point (capillary) 130–172° C. and a decomposition point (capillary) 172° C.

(C) Using the procedure of Ser. No. 275,981, individual streams of 81 g. 1,5,9-cyclododecatriene and 260 g. bromine were proportionally and simultaneously added to a stirred mixture of 159 ml. benzene and 92 ml. t-butyl alcohol, with the temperature being maintained at 25° C. After a reaction period of 3 hours, the white crystalline product was collected by filtration and washed 5 separate times with 100 ml. portions of the solvent of the same composition as used in the bromination reaction. The dried product weighed 136 g. and had a melting point (capillary) 198–200° C. and a decomposition point (capillary) 215° C.

EXAMPLE II

A suspension of 5 g. of commercially produced hexabromocyclododecane (melting point (capillary) 174–183° C., decomposition point (capillary) 183° C.), and 20 ml. ethanol was refluxed for 20 minutes, and the mixture was filtered while hot. The ethanol-insoluble fraction (3.5 g.) was recrystallized from benzene, giving 2.3 g. hexabromocyclododecane as a colorless solid (melting point (capillary) 205–208° C., decomposition point (capillary) 219° C.). The ethanol-soluble material was an unidentified light yellow solid, having a melting point of 68–102° C. and a decomposition point of 106° C.

Other leaching-recrystallization combinations, such as amyl acetate-toluene and diethyl ketone-chlorobenzene, give similar results.

One indication of the differences among the products of the above examples is shown by the melting points and decomposition points, obtained from capillary tube observations.

The samples were also thermally analyzed by differential scanning calorimetry (DSC). The apparatus used was a Du Pont 900 DSC, model 900963, using an aluminum reference pan, with the system heated at 10° C./minute, starting at room temperature. The atmosphere in the DSC cell was 0.6 s.c.f.h. of $N_2$. The horizontal temperature scale is approximately 50° C./inch, with exact values obtained from a calibration sheet.

It it understood that melting points from DSC are, generally, higher than the value obtained by typical capillary tube measurement. DSC melting points are typically less accurate than are capillary melting points, due to the higher heating rate used in the DSC method. Since DSC is based upon the change of heat content, a DSC thermogram furnishes not only an indication of the melting point but also information concerning the beginning, extent and completion of decomposition, thus giving a basis for the term "thermal stability." The DSC values below show (a) maximum endotherm or melting point, (b) start of decomposition and (c) finish of decomposition.

| Sample: | DSC values |
|---|---|
| Ex. I-A | 194°—225°—226° |
| Ex. I-C | 205°—236°—287° |
| Ex. II | 211°—236°—292° |

Both DSC and capillary temperatures indicate differences among the compounds tested, in that prior art procedures produce a hexabromocyclododecane product having a lower decomposition point than does the product from this invention. The results above indicate that the hexabromocyclododecane of this invention is thermally stable at 235° C., while the prior art compound starts to decompose at 225° C. These indicated differences are shown to be significant when a thermoplastic polymer, such as polypropylene, containing some of the fire retarding agent, is processed at typical polymer processing conditions, such as in a Brabender for 10 minutes at 200° C. As noted below, prior art products decompose, with consequent discoloration, at temperatures at which hexabromocyclododecane according to this invention is thermally stable.

EXAMPLE III

Evaluation of Hexabromocyclododecane in Polypropylene

Procedure: Test samples were prepared by mixing 35.6 g. polypropylene and 0.8 g. $Sb_2O_3$. This mixing was done in a Brabender having a mixing bowl of 40 cc. capacity, at 200° C. This mixture was compression molded to form a 5″ x 2″ x ⅛″ piece. From this slab was cut a 5″ x ¼″ x ⅛″ sample piece for Oxygen Index Test (ASTM D-2863). The remainder of the slab was retained for color comparison. The same procedure was used to form mixtures having the same amounts of polypropylene and antimony trioxide plus 1.6 g. hexabromocyclododecane, as prepared in the above procedure. When the hexabromocyclododecane was added to the polypropylene-antimony trioxide mixture, mixing was done in the Brabender for 10 minutes at 200° C., using a sigma blade at 50 r.p.m. The mixture was then removed and compression molded as above, with Oxygen Index samples being cut from the respective molded pieces and the remainder of the molded pieces being used for color comparison.

The results of the evaluations of the various molded pieces are shown below, with the sample number referring to the hexabromocyclododecane preparation method.

| Sample | Oxygen Index | Color evaluation |
|---|---|---|
| 1-A | 29.1 | Yellow-tan (indicating decomposition). |
| 1-B | 29.1 | Tan (indicating decomposition). |
| 1-C | 29.1 | White. |
| 2 | 29.1 | Do. |

For comparison, neat polypropylene had an O.I.=18.0 and showed no discoloration at 200° C. by remaining white. A sample of the polypropylene-antimony oxide described in the paragraph above, similarly tested, had an O.I.=18.5 and a color evaluation of white, showing no discoloration at 200° C. (the change in O.I. rating to 18.5 merely shows some loading of a non-combustible inorganic; the composition still burns).

These results show that the flame retardant composition using the thermally stable components of hexabromocyclododecane, either as prepared in a bromination using a lower alkanol and aromatic hydrocarbon as the solvent medium or as obtained from the leaching-recrystallization treatment of commercially-prepared hexabromocyclododecane using a lower alkanol and aromatic hydrocarbon, suffers less thermal decomposition, due to processing at typical polymer processing temperatures, than do compositions using hexabromocyclododecane obtained from prior art brominations. The prior art material has a lower decomposition threshold temperature, and when this material is processed in a composition, it tends to decompose more readily at the typical processing temperature than does the material of the invention; thus the composition containing the prior art material shows discoloration.

Other flame retardant compositions using polypropylene and other polymers, such as 95% polypropylene-5% polyisobutylene, 90% polypropylene-10% polyethylene and 85% polypropylene-15% copolymer of 72 weight percent ethylene and 28 weight percent of vinyl acetate, give similar color results when evaluated as in Example IV.

While the present invention has been described herein with reference to particular embodiments thereof, it will be appreciated by those skilled in the art that various changes and modifications can be made without departing from the scope of the invention as set forth.

What is claimed is:

1. A self-extinguishing composition comprising (A) a thermoplastic polymer of ethylenically-unsaturated monomers composed of at least 70 mole percent propylene and (B) a flame retardant amount of a mixture of (1) a hexabromocyclododecane having a melting point above 200° C. as indicated by the maximum endotherm determined by differential scanning calorimetry and (2) antimony trioxide, the amount of the hexabromocyclododecane component based on the total weight of the composition being from about 1 to 6 weight percent and the ratio of said component to antimony trioxide varying from about 0.5 to about 5.

2. The composition of claim 1 wherein the hexabromocyclododecane has a decomposition threshold temperature above 235° C., as determined by differential scanning calorimetry.

3. The composition of claim 1 wherein the thermoplastic polymer is polypropylene and the hexabromocyclododecane constitutes about 1.3 to 4.0% of the total weight of the composition.

References Cited

UNITED STATES PATENTS

| 3,419,518 | 12/1968 | Mahling et al. | 260—45.75 |
| 3,093,599 | 6/1963 | Mueller-Tamm et al. | 260—45.75 |
| 3,558,727 | 1/1971 | Jenkner et al. | 260—45.7 |

VERONICA P. HOKE, Primary Examiner

U.S. Cl. X.R.

260—45.7 R, 45.75 K

PO-1050
(5/69)

UNITED STATES PATENT OFFICE
CERTIFICATE OF CORRECTION

Patent No. 3,849,371          Dated November 19, 1974

Inventor(s) Lionel T. Wolford and John Versnel

It is certified that error appears in the above-identified patent and that said Letters Patent are hereby corrected as shown below:

Column 1, line 57, after "due to" insert -- thermal decomposition of one or more of the components --. Column 2, line 62, change "based in" to -- based on --. Column 3, line 21, change "255°C." to -- 225°C.--.

Signed and sealed this 4th day of March 1975.

(SEAL)
Attest:

RUTH C. MASON
Attesting Officer

C. MARSHALL DANN
Commissioner of Patents
and Trademarks